(12) United States Patent
Kimura et al.

(10) Patent No.: US 7,415,170 B2
(45) Date of Patent: Aug. 19, 2008

(54) DATA PROCESSING APPARATUS, IMAGE PROCESSING APPARATUS, CAMERA, AND DATA PROCESSING METHOD

(75) Inventors: Katsuji Kimura, Osaka (JP); Takuji Yoshida, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 697 days.

(21) Appl. No.: 10/869,819

(22) Filed: Jun. 15, 2004

(65) Prior Publication Data
US 2005/0007470 A1 Jan. 13, 2005

(30) Foreign Application Priority Data
Jun. 18, 2003 (JP) ............................. 2003-174061

(51) Int. Cl.
*G06K 9/32* (2006.01)
(52) U.S. Cl. ...................................... 382/300; 382/287
(58) Field of Classification Search ................. 382/300, 382/254–275
See application file for complete search history.

(56) References Cited

U.S. PATENT DOCUMENTS

| | | | | |
|---|---|---|---|---|
| 4,716,455 | A | * | 12/1987 | Ozawa et al. ................ 348/277 |
| 5,148,497 | A | * | 9/1992 | Pentland et al. ............. 382/249 |
| 5,382,976 | A | | 1/1995 | Hibbard |
| 5,390,264 | A | * | 2/1995 | Ishihara et al. .............. 382/260 |
| 5,629,734 | A | * | 5/1997 | Hamilton et al. .......... 348/222.1 |
| 5,652,621 | A | | 7/1997 | Adams, Jr. et al. |
| 6,091,862 | A | | 7/2000 | Okisu |

(Continued)

FOREIGN PATENT DOCUMENTS

JP 07-059098 3/1995

(Continued)

OTHER PUBLICATIONS

Chang, et al., "Color filter array recovery using a threshhold-based variable number of gradients," Proceedings of the SPIE-The International Society for Optical Engineering SPIE-Int. Soc. Opt. Eng USA, vol. 3650, Jan. 27, 1999, pp. 36-43.

(Continued)

*Primary Examiner*—Jingge Wu
*Assistant Examiner*—Tsung-Yin Tsai
(74) *Attorney, Agent, or Firm*—Edwards Angell Palmer & Dodge LLP; David G. Conlin; William J. Daley, Jr.

(57) ABSTRACT

A data processing apparatus is provided for processing an image signal obtained from a solid-state image pickup device, in which a plurality of types of color filters are discretely provided on pixels, and a pixel to be interpolated and surrounding pixels thereof have image signals. The apparatus comprises an interpolation section for generating a missing color signal in the image signal of each pixel by interpolation using at least the image signals of the surrounding pixels among the image signals of the pixel to be interpolated and the surrounding pixels thereof. The interpolation section obtains an interpolation pattern, which is similar to a pattern of data values of the pixel to be interpolated and the surrounding pixels thereof, depending on uniformity and gradient of the image signals of the pixel to be interpolated and the surrounding pixels thereof, and performs interpolation depending on the interpolation pattern.

15 Claims, 10 Drawing Sheets

U.S. PATENT DOCUMENTS 6,366,694 B1 * 4/2002 Acharya .................... 382/167
6,563,537 B1   5/2003 Kawamura et al.

FOREIGN PATENT DOCUMENTS

| JP | 07-203465 | 8/1995 |
| JP | 11-103466 | 4/1999 |
| JP | 2001-177767 | 6/2001 |
| JP | 2002-112276 | 4/2002 |

OTHER PUBLICATIONS

Kimmel, R., "Demosaicing: Image reconstruction from color CCD samples" IEEE Transactions on Image Processing, IEEE Inc. New York, US, vol. 8, No. 9, Sep. 1999, pp. 1221-1228.

* cited by examiner

FIG.3A

| G11 | Q21 | G31 | Q41 | G51 |
|-----|-----|-----|-----|-----|
| P12 | G22 | P32 | G42 | P52 |
| G13 | Q23 | G33 | Q43 | G53 |
| P14 | G24 | P34 | G44 | P54 |
| G15 | Q25 | G35 | Q45 | G55 |

FIG.3B

| Q11 | G21 | Q31 | G41 | Q51 |
|-----|-----|-----|-----|-----|
| G12 | P22 | G32 | P42 | G52 |
| Q13 | G23 | Q33 | G43 | Q53 |
| G14 | P24 | G34 | P44 | G54 |
| Q15 | G25 | Q35 | G45 | Q55 |

| G11 | Q21 | G31 | Q41 | G51 |
|---|---|---|---|---|
| P12 | G22 | P32 | G42 | P52 |
| G13 | Q23 | G33 | Q43 | G53 |
| P14 | G24 | P34 | G44 | P54 |
| G15 | Q25 | G35 | Q45 | G55 |

FIG.4A

| G11 | Q21 | G31 | Q41 | G51 |
|---|---|---|---|---|
| P12 | G22 | P32 | G42 | P52 |
| G13 | Q23 | G33 | Q43 | G53 |
| P14 | G24 | P34 | G44 | P54 |
| G15 | Q25 | G35 | Q45 | G55 |

FIG.4B

| G11 | Q21 | G31 | Q41 | G51 |
|---|---|---|---|---|
| P12 | G22 | P32 | G42 | P52 |
| G13 | Q23 | G33 | Q43 | G53 |
| P14 | G24 | P34 | G44 | P54 |
| G15 | Q25 | G35 | Q45 | G55 |

FIG.4C

| G11 | Q21 | G31 | Q41 | G51 |
|---|---|---|---|---|
| P12 | G22 | P32 | G42 | P52 |
| G13 | Q23 | G33 | Q43 | G53 |
| P14 | G24 | P34 | G44 | P54 |
| G15 | Q25 | G35 | Q45 | G55 |

FIG.4D

| G11 | Q21 | G31 | Q41 | G51 |
|---|---|---|---|---|
| P12 | G22 | P32 | Q42 | P52 |
| G13 | Q23 | G33 | Q43 | G53 |
| P14 | G24 | P34 | G44 | P54 |
| G15 | Q25 | G35 | Q45 | G55 |

FIG.4E

| G11 | Q21 | G31 | Q41 | G51 |
|---|---|---|---|---|
| P12 | G22 | P32 | G42 | P52 |
| G13 | Q23 | G33 | Q43 | G53 |
| P14 | G24 | P34 | G44 | P54 |
| G15 | Q25 | G35 | Q45 | G55 |

FIG.4F

| G11 | Q21 | G31 | Q41 | G51 |
|---|---|---|---|---|
| P12 | G22 | P32 | G42 | P52 |
| G13 | Q23 | G33 | Q43 | G53 |
| P14 | G24 | P34 | G44 | P54 |
| G15 | Q25 | G35 | Q45 | G55 |

FIG.4G

| G11 | Q21 | G31 | Q41 | G51 |
|---|---|---|---|---|
| P12 | G22 | P32 | G42 | P52 |
| G13 | Q23 | G33 | Q43 | G53 |
| P14 | G24 | P34 | G44 | P54 |
| G15 | Q25 | G35 | Q45 | G55 |

FIG.4H

| Q01 | G11 | Q21 | G31 | Q41 | G51 |
|-----|-----|-----|-----|-----|-----|
| G02 | P12 | G22 | P32 | G42 | P52 |
| Q03 | G13 | Q23 | G33 | Q43 | G53 |
| G04 | P14 | G24 | P34 | G44 | P54 |
| Q05 | G15 | Q25 | G35 | Q45 | G55 |

FIG.5A

| 100 | 100 | 100 | 100 | 100 | 100 |
|-----|-----|-----|-----|-----|-----|
| 100 | 100 | 100 | 100 | 100 | 100 |
| 0 | 0 | 0 | 0 | 0 | 0 |
| 100 | 100 | 100 | 100 | 100 | 100 |
| 0 | 0 | 0 | 0 | 0 | 0 |

FIG.5B

| 100 | 100 | 100 | 0 | 100 | 100 |
|-----|-----|-----|-----|-----|-----|
| 100 | 100 | 100 | 100 | 100 | 100 |
| 0 | 0 | 0 | 0 | 0 | 0 |
| 100 | 100 | 100 | 100 | 100 | 100 |
| 0 | 0 | 0 | 0 | 0 | 0 |

FIG.5C

| Q01 | G11 | Q21 | G31 | Q41 | G51 |
|-----|-----|-----|-----|-----|-----|
| G02 | P12 | G22 | P32 | G42 | P52 |
| Q03 | G13 | Q23 | G33 | Q43 | G53 |
| G04 | P14 | G24 | P34 | G44 | P54 |
| Q05 | G15 | Q25 | G35 | Q45 | G55 |

FIG.5D

| P11 | G21 | P31 | G41 | P51 |
|---|---|---|---|---|
| G12 | Q22 | G32 | Q42 | G52 |
| P13 | G23 | P33 | G43 | P53 |
| G14 | Q24 | G34 | Q44 | G54 |
| P15 | G25 | P35 | G45 | P55 |

FIG.6A

| P11 | G21 | P31 | G41 | P51 |
|---|---|---|---|---|
| G12 | Q22 | G32 | Q42 | G52 |
| P13 | G23 | P33 | G43 | P53 |
| G14 | Q24 | G34 | Q44 | G54 |
| P15 | G25 | P35 | G45 | P55 |

FIG.6B

| P11 | G21 | P31 | G41 | P51 |
|---|---|---|---|---|
| G12 | Q22 | G32 | Q42 | G52 |
| P13 | G23 | P33 | G43 | P53 |
| G14 | Q24 | G34 | Q44 | G54 |
| P15 | G25 | P35 | G45 | P55 |

FIG.6C

| P11 | G21 | P31 | G41 | P51 |
|---|---|---|---|---|
| G12 | Q22 | G32 | Q42 | G52 |
| P13 | G23 | P33 | G43 | P53 |
| G14 | Q24 | G34 | Q44 | G54 |
| P15 | G25 | P35 | G45 | P55 |

FIG.6D

| P11 | G21 | P31 | G41 | P51 |
|---|---|---|---|---|
| G12 | Q22 | G32 | Q42 | G52 |
| P13 | G23 | P33 | G43 | P53 |
| G14 | Q24 | G34 | Q44 | G54 |
| P15 | G25 | P35 | G45 | P55 |

FIG.6E

| P11 | G21 | P31 | G41 | P51 |
|---|---|---|---|---|
| G12 | Q22 | G32 | Q42 | G52 |
| P13 | G23 | P33 | G43 | P53 |
| G14 | Q24 | G34 | Q44 | G54 |
| P15 | G25 | P35 | G45 | P55 |

FIG.6F

| P11 | G21 | P31 | G41 | P51 |
|---|---|---|---|---|
| G12 | Q22 | G32 | Q42 | G52 |
| P13 | G23 | P33 | G43 | P53 |
| G14 | Q24 | G34 | Q44 | G54 |
| P15 | G25 | P35 | G45 | P55 |

FIG.6G

| P11 | G21 | P31 | G41 | P51 |
|---|---|---|---|---|
| G12 | Q22 | G32 | Q42 | G52 |
| P13 | G23 | P33 | G43 | P53 |
| G14 | Q24 | G34 | Q44 | G54 |
| P15 | G25 | P35 | G45 | P55 |

FIG.6H

| G11 | Q21 | G31 | Q41 | G51 |
|---|---|---|---|---|
| P12 | G22 | P32 | G42 | P52 |
| G13 | Q23 | G33 | Q43 | G53 |
| P14 | G24 | P34 | G44 | P54 |
| G15 | Q25 | G35 | Q45 | G55 |
FIG.7A
| 100 | 100 | 100 | 100 | 40 |
|---|---|---|---|---|
| 100 | 100 | 100 | 40 | 100 |
| 100 | 100 | 40 | 100 | 100 |
| 100 | 40 | 100 | 100 | 100 |
| 40 | 100 | 100 | 100 | 100 |
FIG.7B
|   | −1 |   |
|---|---|---|
| −1 | 4 | −1 |
|   | −1 |   |
FIG.7C
| 100 | 100 | 100 | 115 | 10 |
|---|---|---|---|---|
| 100 | 100 | 115 | 10 | 115 |
| 100 | 115 | 10 | 115 | 100 |
| 115 | 10 | 115 | 100 | 100 |
| 10 | 115 | 100 | 100 | 100 |
FIG.7D
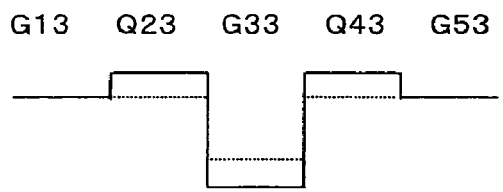
FIG.7E
FIG.7F
| −1 |   |   |
|---|---|---|
|   | 2 |   |
|   |   | −1 |
FIG.7G
| 100 | 100 | 111 | 115 | 10 |
|---|---|---|---|---|
| 100 | 111 | 115 | 10 | 115 |
| 111 | 115 | 10 | 115 | 111 |
| 115 | 10 | 115 | 111 | 100 |
| 10 | 115 | 111 | 100 | 100 |
FIG.7H

FIG.8

| G | R | G | R | G |
|---|---|---|---|---|
| B | G | B | G | B |
| G | R | G | R | G |
| B | G | B | G | B |
| G | R | G | R | G |

FIG.9A

| G11 | Q21 | G31 | Q41 | G51 |
|-----|-----|-----|-----|-----|
| P12 | G22 | P32 | G42 | P52 |
| G13 | Q23 | G33 | Q43 | G53 |
| P14 | G24 | P34 | G44 | P54 |
| G15 | Q25 | G35 | Q45 | G55 |

FIG.9B

| Q11 | G21 | Q31 | G41 | Q51 |
|-----|-----|-----|-----|-----|
| G12 | P22 | G32 | P42 | G52 |
| Q13 | G23 | Q33 | G43 | Q53 |
| G14 | P24 | G34 | P44 | G54 |
| Q15 | G25 | Q35 | G45 | Q55 |

FIG.10A

| G11 | Q21 | G31 | Q41 | G51 |
|---|---|---|---|---|
| P12 | G22 | P32 | G42 | P52 |
| G13 | Q23 | G33 | Q43 | G53 |
| P14 | G24 | P34 | G44 | P54 |
| G15 | Q25 | G35 | Q45 | G55 |

FIG.10B

| 100 | 0 | 100 | 0 | 100 |
|---|---|---|---|---|
| 100 | 0 | 100 | 0 | 100 |
| 100 | 0 | 100 | 0 | 100 |
| 100 | 0 | 100 | 0 | 100 |
| 100 | 0 | 100 | 0 | 100 |

FIG.10C  G values after interpolation

| 100 | 50 | 100 | 50 | 100 |
|---|---|---|---|---|
| 50 | 0 | 50 | 0 | 50 |
| 100 | 50 | 100 | 50 | 100 |
| 50 | 0 | 50 | 0 | 50 |
| 100 | 50 | 100 | 50 | 100 |

FIG.10D  P values after interpolation

| 100 | 0 | 100 | 0 | 100 |
|---|---|---|---|---|
| 100 | 0 | 100 | 0 | 100 |
| 100 | 0 | 100 | 0 | 100 |
| 100 | 0 | 100 | 0 | 100 |
| 100 | 0 | 100 | 0 | 100 |

FIG.10E  Q values after interpolation

| 0 | 0 | 0 | 0 | 0 |
|---|---|---|---|---|
| 0 | 0 | 0 | 0 | 0 |
| 0 | 0 | 0 | 0 | 0 |
| 0 | 0 | 0 | 0 | 0 |
| 0 | 0 | 0 | 0 | 0 |

FIG.11A

| G11 | Q21 | G31 | Q41 | G51 |
|-----|-----|-----|-----|-----|
| P12 | G22 | P32 | G42 | P52 |
| G13 | Q23 | G33 | Q43 | G53 |
| P14 | G24 | P34 | G44 | P54 |
| G15 | Q25 | G35 | Q45 | G55 |

FIG.11B

| 0 | 0 | 0 | 0 | 0 |
|---|---|---|---|---|
| 100 | 100 | 100 | 100 | 100 |
| 0 | 0 | 0 | 0 | 0 |
| 100 | 100 | 100 | 100 | 100 |
| 0 | 0 | 0 | 0 | 0 |

FIG.11C

| G13 | G23 | G33 | G43 | G53 |
|-----|-----|-----|-----|-----|
| 0 | 50 | 0 | 50 | 0 |

DATA PROCESSING APPARATUS, IMAGE PROCESSING APPARATUS, CAMERA, AND DATA PROCESSING METHOD

This non-provisional application claims priority under 35 U.S.C. §119(a) on Patent Application No. 2003-174061 filed in Japan on Jun. 18, 2003, the entire contents of which are hereby incorporated by reference.

BACKGROUND OF THE INVENTION

1. Field of the Invention

The present invention relates to a data processing apparatus (e.g., a camera signal processing apparatus, etc.) for interpolating a missing color signal into an image signal of each pixel, which is used in cameras having a solid-state image pickup device (e.g., video cameras, digital cameras, etc.). Also, a data processing method using this data processing apparatus, an image processing apparatus using the data processing method, and a camera using this image processing apparatus and a solid-state image pickup device (e.g., video cameras, digital cameras, mobile telephones with a camera, etc.).

2. Description of the Related Art

In conventional cameras (e.g., video cameras, digital cameras, etc., and hereinafter, referred to as cameras), which utilize a single solid-state image pickup device, color filters are discretely disposed on pixels of the solid-state image pickup device.

Each color filter has one of three colors (three primary colors), e.g., red (R), green (G), and blue (B). One of the R, G and B filters is disposed on each pixel. A color (color signal) other than the color of the color filter that is provided to a pixel, can be obtained by calculation. In this case, spatially continuous data (here, two-dimensional) can be obtained as if three color filters were continuously provided. Such a calculation for obtaining spatially continuous data is called interpolation.

Hereinafter, interpolation will be described in detail.

FIG. 8 is a diagram showing an arrangement of colors in a conventional color filter.

Generally, in a color filter plate, G color filters are arranged in a checkerboard pattern, while R and B color filters together are also arranged in a checkerboard pattern where the R or B color filters are arranged on other line (FIG. 8). This arrangement is called a Bayer array.

If a solid-state image pickup device digitizes an image signal via a color filter plate having the Bayer array, each pixel provides an image signal indicating only one color. Therefore, color data, which is not provided to a pixel, needs to be interpolated based on the image signals of the other pixels having the missing color in order to obtain a full-color image signal (including all of R, G, and B colors) for each pixel.

In this case, G pixels, and R and B pixels are interpolated by separate methods.

FIGS. 9A and 9B are diagrams for explaining a conventional interpolation technique. In these figures, the pixels, to which the G filters are provided, are indicated by G. Since the R and B filters are arranged on pixels to be interpolated, the pixels, to which the R and B filters are provided, are indicated by P and Q, respectively.

As shown in FIG. 9A, for example, G33 is assumed to be a pixel to be interpolated. The R and B (P and Q) data of the pixel needs to be obtained by interpolation. The G pixel neighbors are R pixels and B pixels.

P and Q obtained by interpolation of G33 are represented by P33 and Q33. Specifically, P33 and Q33 are calculated based on P's and Q's neighboring G33 by the following expressions:

$$G33=G33$$

$$P33=(P32+P34)/2$$

$$Q33=(Q23+Q43)/2.$$

Next, as shown in FIG. 9B, Q33 is assumed to be a pixel to be interpolated. The G and P data of the pixel is obtained by interpolation. The Q pixel neighbors are G pixels and P pixels.

G and P obtained by interpolation of Q33 are represented by G33 and P33. Specifically, G33 and P33 are calculated based on G's and P's neighboring Q33, respectively, by the following expressions:

$$G33=(G23+G32+G34+G43)/4$$

$$P33=(P22+P24+P42+P44)/4$$

$$Q33=Q33.$$

However, the above-described general interpolation technique raises image distortion and a reduction in resolution at an edge portion, as described below.

Hereinafter, this problem will be described with reference to FIG. 10A, where a vertically striped pattern is imaged.

In FIG. 10A, a line formed of G11 to G15 is a high luminance line, which is typically displayed white. A line formed of Q21 to Q25 is a low luminance line, which is typically displayed black.

FIG. 10B is a diagram showing an image signal value of each pixel in the vertically striped pattern of FIG. 10A, where each white pixel has a value 100, while each black pixel has a value 0.

G33 is now assumed to be a pixel to be interpolated. Interpolation is performed in accordance with the above-described expressions. As a result, $$G33 =100,$$

$$P33=(P32+P34)/2=100, \text{ and}$$

$$Q33=(Q23+Q43)/2=0.$$

Similarly, all other pixels are subjected to interpolation in accordance with the above-described expressions. The results are shown in FIGS. 10C to 10E. FIG. 10C shows the values of G's after interpolation. FIG. 10D shows the values of P's after interpolation. FIG. 10E shows the values of Q's after interpolation.

As shown in FIG. 10C, the interpolated data of G's does not represent the vertically striped pattern, thus the image is distorted. As shown in FIG. 10E, the interpolated data of Q's does not represent the vertically striped pattern, where the stripes disappear, i.e., the image is distorted.

An attempt has been made to solve such an image distortion problem caused by interpolation in, for example, Japanese Laid-Open Publication No. 7-59098. In this document, the gray levels of pixels are obtained based on the differences between the horizontally or vertically neighboring pixels. The gray level is compared with a predetermined threshold. Based on the result of comparison, interpolation is performed.

Hereinafter, the interpolation technique disclosed in the above-described document will be described with reference to FIG. 11A, where a horizontally striped pattern is imaged.

In FIG. 11A, lines respectively formed of G11 to G51, G13 to G53, and G15 to G55 each have a low luminance, which are typically displayed black. Lines respectively formed of P12 to P52 and P14 to P54 each have a high luminance, which are typically displayed white.

FIG. 11B shows an image signal value of each pixel of the horizontally striped pattern of FIG. 11A, where each white pixel has a value 100, while each black pixel has a value 0.

According to the above-described document, if pixel Q23 of FIG. 11A is assumed to be a pixel to be interpolated, color data G23 and P23 are calculated by:

$$Q23=Q23P23=0.25\times[P14\text{-Adap}(G14)+P12\text{-Adap}(G12)+P32\text{-Adap}(G32)+P34\text{-Adap}(G34)]+\text{Adap}(G23) \quad G23=\text{Adap}(G23) \quad (1)$$

Adap in expression (1) is calculated by expression (2) according to the above-described document, which includes conditional branches. Expression (2) below corresponds to pixel G23 of FIG. 11A. In expression (2), "Threshold" represents a predetermined threshold, "Gdiff-hor" represents a horizontal difference in luminance, and "Gdiff-ver" represents a vertical difference in luminance.

$$\text{For Gdiff-hor}=|G13-G33|\,\text{Gdiff-ver}=|G22-G24|\,\text{Threshold}=\text{Predetermined value If (Gdiff-hor<Threshold) and (Gdiff-ver<Threshold) or (Gdiff-hor>Threshold) and (Gdiff-ver>Threshold) then }|\text{Adap}(G23)=(G13+G33+G22+G24)/4|\,\text{If (Gdiff-hor<Threshold) and (Gdiff-ver>Threshold) then }|\text{Adap}(G23)=(G13+G33)/2|\,\text{If (Gdiff-hor>Threshold) and (Gdiff-ver<Threshold) then }|\text{Adap}(G23)=(G22+G24)/2| \quad (2)$$

However, some images may be distorted by the interpolation technique disclosed in the above-described document.

For example, G23 is calculated based on the data values of FIG. 11B in accordance with expressions (1) and (2). As a result, $$\text{Gdiff-hor}=\text{Gdiff-ver}=0.$$

And, irrespective of the value of Threshold, $$G23=\text{Adap}(G23)=|G13+G33+G22+G24|/4=50.$$

G43 is similarly calculated to be 50.

According to the above-described document, G13, G33 and G53 are all calculated to be 0 based on the data of each pixel.

The resultant data of G13 to G53 is shown in FIG. 11C.

In FIG. 11C, interpolation causes false white signals, which are otherwise black in FIG. 11A, so that a difference in luminance occurs on a horizontal line. The resultant pattern shows alternating black and white or weak and strong luminance, which is called zipper noise. That is, the image is distorted.

Also in the interpolation technique of the above-described document, vertical and horizontal differences in luminance values are compared with the predetermined threshold. This technique is effective if image signals are free from noise and the like. However, if horizontal and vertical differences in luminance value fluctuate near the threshold due to noise or the like, the interpolation calculation fluctuates in a time-series manner, so that data fluctuates. For example, a pixel to be interpolated is likely to flicker in a time-series manner.

SUMMARY OF THE INVENTION

According to an aspect of the present invention, a data processing apparatus is provided for processing an image signal obtained from a solid-state image pickup device, in which a plurality of types of color filters are discretely provided on pixels, and a pixel to be interpolated and surrounding pixels thereof have image signals. The apparatus comprises an interpolation section for generating a missing color signal in the image signal of each pixel by interpolation using at least the image signals of the surrounding pixels among the image signals of the pixel to be interpolated and the surrounding pixels thereof. The interpolation section obtains at least one interpolation pattern, which is similar to a pattern of data values of the pixel to be interpolated and the surrounding pixels thereof, depending on uniformity and gradient of the image signals of the pixel to be interpolated and the surrounding pixels thereof, and performs interpolation depending on the at least one interpolation pattern.

In one embodiment of this invention, the data processing apparatus further comprises an interpolation pattern storage section for storing a plurality of interpolation patterns representing the uniformity and gradient of the image signals. The interpolation section selects the interpolation pattern, which is similar to a pattern of data values of the pixel to be interpolated and the surrounding pixels thereof, depending on uniformity and gradient of the image signals of the pixel to be interpolated and the surrounding pixels thereof, from the plurality of interpolation patterns in the interpolation pattern storage section, and performs interpolation depending on the selected interpolation pattern.

In one embodiment of this invention, identification information is given to each of the plurality of interpolation patterns stored in the interpolation pattern storage section, and the interpolation section stores the identification information of the selected interpolation pattern in the interpolation pattern storage section.

In one embodiment of this invention, the interpolation section calculates directional data indicating a similarity between each of the at least one interpolation pattern, and the pattern of data values of the pixel to be interpolated and the surrounding pixels thereof, and selects an interpolation pattern where the directional data is the smallest.

In one embodiment of this invention, the interpolation section selects one of the at least one interpolation pattern based on whether the pixel to be interpolated is a pixel mainly contributing to luminance or a pixel not mainly contributing to luminance, and performs interpolation depending on the selected interpolation pattern.

In one embodiment of this invention, at least one of the plurality of interpolation patterns stored in the interpolation pattern storage section is used when the pixel to be interpolated is a pixel mainly contributing to luminance, and at least one of the plurality of interpolation patterns stored in the interpolation pattern storage section is used when the pixel to be interpolated is a pixel not mainly contributing to luminance.

In one embodiment of this invention, the interpolation pattern storage section stores, as the plurality of interpolation patterns, a pattern, in which pixels having prescribed values are horizontally arranged; a pattern, in which pixels having prescribed values are vertically arranged; a pattern, in which pixels having prescribed values are arranged slanting upward to the right; a pattern, in which pixels having prescribed values are arranged slanting downward to the right; a pattern, in which pixels having prescribed values are arranged together at an upper left corner portion; a pattern, in which pixels having prescribed values are arranged together at an upper right corner portion; a pattern, in which pixels having prescribed values are arranged together at a lower left corner portion; and a pattern, in which pixels having prescribed values are arranged together at a lower right corner portion.

In one embodiment of this invention, the interpolation section performs interpolation based on a prescribed expression when none of the plurality of interpolation patterns stored in the interpolation pattern storage section is similar to the pattern of the data values of the image signals of the pixel to be interpolated and the surrounding pixels thereof.

In one embodiment of this invention, when two or more of the plurality of interpolation patterns stored in the interpolation pattern storage section are similar to the pattern of the data values of the image signals of the pixel to be interpolated and the surrounding pixels thereof, the interpolation section selects one of the two or more interpolation patterns, depending on an interpolation pattern selected for one or more of the surrounding pixels.

In one embodiment of this invention, the interpolation section performs interpolation based on an expression corresponding to the obtained interpolation pattern.

According to another aspect of the present invention, an image processing apparatus is provided, which comprises: the above-described data processing apparatus; and an image processing section for perform image processing depending on the interpolation pattern obtained by the data processing apparatus.

According to another aspect of the present invention, a camera is provided, which comprises the above-described image processing apparatus. The camera receives an image signal from a solid-state image pickup device, and performs the interpolation and the image processing to obtain image data for the camera.

According to another aspect of the present invention, a data processing method is provided for processing an image signal obtained from a solid-state image pickup device, in which a plurality of types of color filters are discretely provided on pixels, and a pixel to be interpolated and surrounding pixels thereof have image signals. The method comprises the steps of: obtaining an interpolation pattern, which is similar to a pattern of data values of the pixel to be interpolated and the surrounding pixels thereof, depending on uniformity and gradient of the image signals of the pixel to be interpolated and the surrounding pixels thereof; and performing interpolation depending on the interpolation pattern to generate a missing color signal in the image signal of the pixel to be interpolated.

Functions of the present invention will be described below.

A plurality of types of color filters, such as RGB (three primary colors) filters, are discretely arranged (e.g., Bayer array) in a solid-state image pickup device. A digitized image signal (pixel signal) is obtained in such a device. According to the present invention, missing color data (signal) can be obtained by interpolation at a pixel, to which a filter corresponding to the missing color is not provided, as if all color filters were continuously arranged in each pixel. For example, when the solid-state image pickup device has 1,000 pixels, each pixel has data of an image signal corresponding to any one of R, G and B. As a result of interpolation, 1,000 pieces of data (signal) are obtained for each of R, G and B. Thus, 3,000 color signals are obtained. Therefore, the spatial (here, two-dimensional) continuity of data can be achieved.

According to the present invention, interpolation is performed as follows. An interpolation pattern, which is similar to a pattern of data values of image signals of a pixel to be interpolated and its surrounding pixels, is obtained based on the uniformity and gradient of the image signals. Interpolation is performed depending on the obtained interpolation pattern. Thus, interpolation is performed, taking into consideration the uniformity and gradient of image signals. It is possible to avoid image distortion, which otherwise occurs in conventional interpolation techniques. In addition, as described in Japanese Laid-Open Publication No. 7-59098, in which a threshold is used in interpolation, a change occurs in the calculation of interpolation due to an influence of noise, so that the image signals fluctuate. Such a problem can be solved by the present invention.

The interpolation patterns are prepared, taking into consideration the uniformity and gradient of image signals. For example, the interpolation pattern storage section stores a pattern, in which pixels having prescribed values are horizontally arranged; a pattern, in which pixels having prescribed values are vertically arranged; a pattern, in which pixels having prescribed values are arranged slanting upward to the right; a pattern, in which pixels having prescribed values are arranged slanting downward to the right; a pattern, in which pixels having prescribed values are arranged together at an upper left corner portion; a pattern, in which pixels having prescribed values are arranged together at an upper right corner portion; a pattern, in which pixels having prescribed values are arranged together at a lower left corner portion; and a pattern, in which pixels having prescribed values are arranged together at a lower right corner portion. For each interpolation pattern, directional data is calculated, which represents a similarity of the interpolation pattern. An interpolation pattern having the smallest directional data value can be selected.

Assuming that a pixel is located in the interpolation pattern, interpolation is performed in accordance with an expression corresponding to the interpolation pattern, using image signals of a pixel to be interpolated and its surrounding pixels, or image signals of its surrounding pixels. This processing is successively performed for all pixels.

When no interpolation pattern, which is similar to a pattern of data values of image signals of a pixel to be interpolated and its surrounding pixels, is stored in the interpolation pattern storage section, a prescribed expression is used to perform interpolation. Thereby, even when no optimum interpolation pattern can be obtained based on the uniformity and gradient, more accurate interpolation can be performed.

When two or more interpolation patterns, which are similar to a pattern of data values of image signals of a pixel to be interpolated and its surrounding pixels, are stored in the interpolation pattern storage section, one of the two or more interpolation patterns can be selected, depending on an interpolation pattern selected for the surrounding pixel. By taking into consideration the interpolation pattern of the surrounding pixel, even when an influence of noise or the like alters image signal data in a time-series manner, it is possible to prevent fluctuation of an image signal calculated by interpolation.

Luminance significantly changes at an edge portion of an image, while a change in color at such a portion is relatively small. Pixels, such as G pixels, which mainly contribute to luminance, significantly change at an edge portion, while pixels, such as R and B pixels, which do not mainly contribute to luminance, changes less. Therefore, by performing interpolation separately for each of the above-described cases, optimum interpolation can be performed.

Moreover, after interpolation, digital image signal processing, such as edge emphasis processing, false color suppression processing, or the like, can be performed based on an interpolation pattern, which has been obtained depending on the uniformity and gradient of image signals of a pixel to be interpolated and its surrounding pixels. Therefore, a satisfactory image signal can be generated.

Thus, the invention described herein makes possible the advantages of providing a data processing apparatus (e.g., a camera signal processing apparatus, etc.), in which an influence of noise can be avoided and image distortion can be prevented when interpolating digitized image signals obtained from a solid-state image pickup device, in which a plurality of types of color filters are discretely provided on pixels; a data processing method using the data processing apparatus; an image processing apparatus using the data processing method; and a camera using the image processing apparatus.

These and other advantages of the present invention will become apparent to those skilled in the art upon reading and understanding the following detailed description with reference to the accompanying figures.

BRIEF DESCRIPTION OF THE DRAWINGS

FIGS. 3A and 3B are image diagrams showing image signals stored in a line memory of FIG. 1, where P and Q respectively indicate an R pixel or a B pixel, or a B pixel or an R pixel.

FIGS. 4A to 4H are diagrams showing exemplary interpolation patterns with respect to a G pixel, where P and Q respectively indicate an R pixel or a B pixel, or a B pixel or an R pixel.

FIGS. 5A to 5D are diagrams for explaining a method of determining an interpolation pattern for interpolation according to the present invention, where P and Q respectively indicate an R pixel or a B pixel, or a B pixel or an R pixel.

FIGS. 6A to 6H are diagrams showing exemplary interpolation patterns with respect to a P pixel, where P and Q respectively indicate an R pixel or a B pixel, or a B pixel or an R pixel.

FIGS. 7A to 7H are diagrams for explaining edge emphasis processing as image processing according to the present invention, where P and Q respectively indicate an R pixel or a B pixel, or a B pixel or an R pixel.

FIG. 8 is a diagram showing a conventional Bayer array arrangement of colors in a color filter.

FIGS. 9A and 9B are diagrams for explaining a conventional interpolation technique, where P and Q respectively indicate an R pixel or a B pixel, or a B pixel or an R pixel.

FIGS. 10A to 10E are diagrams for explaining a problem with conventional interpolation techniques, where P and Q respectively indicate an R pixel or a B pixel, or a B pixel or an R pixel.

FIGS. 11A to 11C are diagrams for explaining another problem with conventional interpolation techniques, where P and Q respectively indicate an R pixel or a B pixel, or a B pixel or an R pixel.

DESCRIPTION OF THE PREFERRED EMBODIMENTS

Hereinafter, the present invention will be described by way of illustrative examples with reference to the accompanying drawings. Particularly, a camera (camera system) comprising an image processing apparatus comprises a data processing apparatus of the present invention, will be described below.

Figure 1:
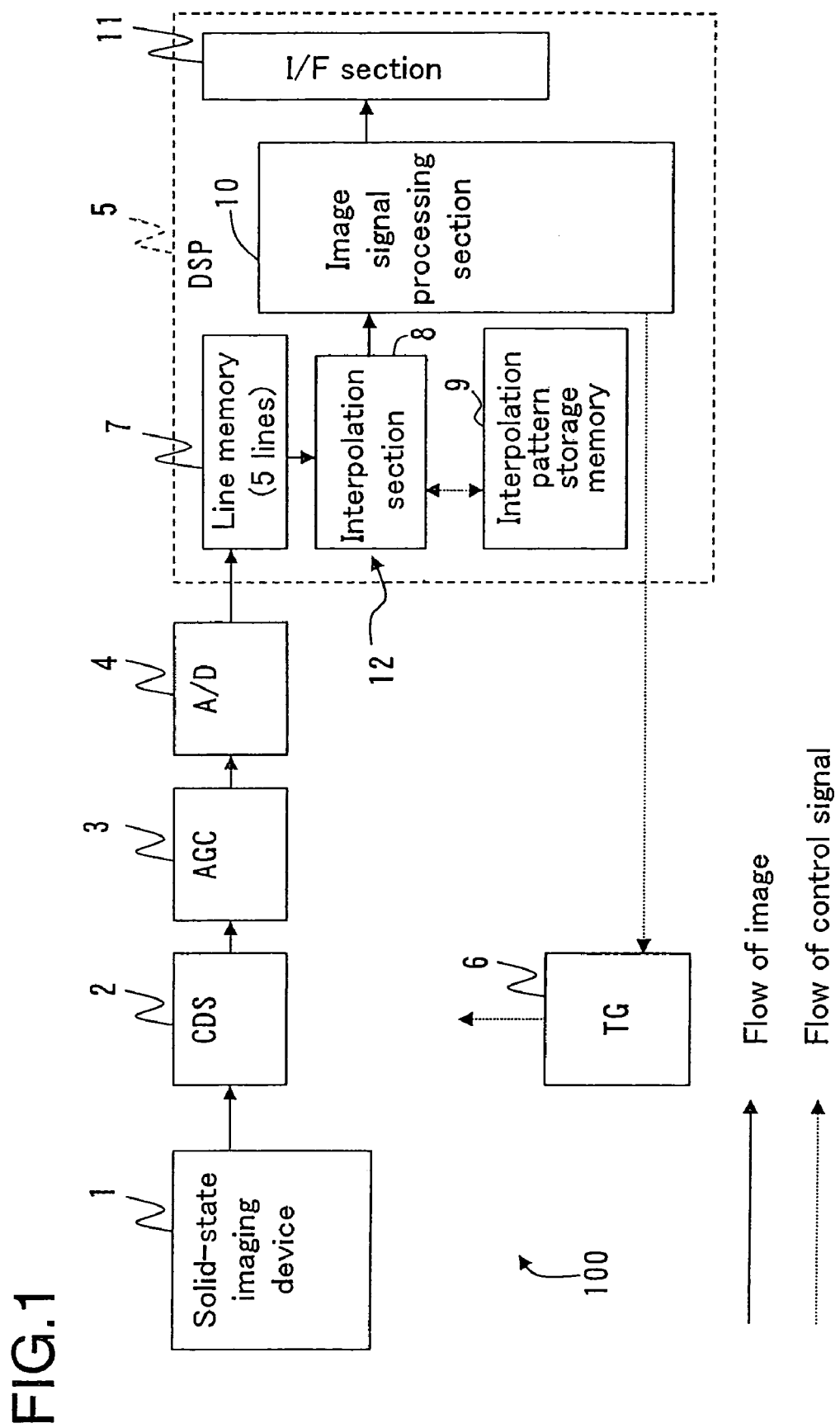
FIG. 1 is a block diagram showing a configuration of a camera according to an embodiment of the present invention.

FIG. 1 is a block diagram showing a configuration of a camera according to an embodiment of the present invention. In FIG. 1, solid arrows indicate flows of image signals, and a dashed arrow indicates the flow of a control signal.

In FIG. 1, the camera 100 comprises a solid-state image pickup device 1, a CDS (correlation double sampling circuit) 2, an AGC (automated gain control circuit) 3, an A/D (analog/digital) conversion circuit 4, a DSP (digital signal processor) 5, which is an image processing apparatus, such as a camera signal processing apparatus or the like, and a TG (timing signal generation circuit) 6.

The solid-state image pickup device 1 comprises photodiodes which perform photoelectric conversion. R, G, and B (three primary colors) color filters are discretely arranged on the photodiodes in a manner called the Bayer array, as shown in FIG. 8. A light signal which enters the photodiode is photoelectrically converted to an electric signal.

The CDS 2 and the AGC 3 perform correlation double sampling and automated gain control processing, respectively, on a signal output by the solid-state image pickup device 1.

The A/D conversion circuit 4 converts an analog image signal to a digital image signal.

The DSP 5 performs image processing (described in detail below) on a digital signal output by the A/D conversion circuit 4.

The TG 6 is a circuit for generating/driving a timing signal for transferring the above-described electric signal.

The DSP 5 comprises a line memory 7 for 5 lines, an interpolation section 8, an interpolation pattern storage memory 9, an image signal processing section 10, and an I/F section 11. The line memory 7, the interpolation section 8, and the interpolation pattern storage memory 9 constitute a data processing apparatus 12.

The line memory 7 holds the data of 5 lines of an image signal input to the DSP 5, and successively supplies the data to the interpolation section 8.

The interpolation section 8 performs interpolation with respect to a pixel to be interpolated based on an image signal input from the line memory 7. An interpolation pattern stored in the interpolation pattern storage memory 9 is optionally used. The interpolation process depends on the uniformity and gradient of image signals of the pixel to be interpolated and its surrounding pixels. The resultant image signals after interpolation are transferred to the image signal processing section 10.

The interpolation pattern storage memory 9 stores a plurality of interpolation patterns in advance. When the interpolation section 8 performs interpolation, an interpolation pattern number selected by the interpolation pattern storage memory 9 is stored, as information for identifying an interpolation pattern, in the interpolation pattern storage memory 9.

The image signal processing section 10 is a well-known block for processing image signals. The detailed description is omitted herein. Typically, the image signal processing section 10 performs a variety of image processing, such as automatic exposure control processing for adjusting the exposure of the solid-state image pickup device 1, automatic white balance control processing for adjusting the white level of an image signal, edge emphasis processing for emphasizing an edge signal, false color suppression processing for removing false color generated at an edge portion, and the like.

The I/F section 11 receives an image signal, which has been processed by the image signal processing section 10, and transfers the image signal in synchronization with external circuitry.

Hereinafter, interpolation performed by the interpolation section 8 will be described with reference to a flowchart shown in FIG. 2 and FIGS. 3A and B to 6.

FIGS. 3A and 3B are diagrams showing an image having 5×5 pixels (5 pixels in each of the horizontal and vertical directions) extracted from an image signal stored in the line memory 7, where a pixel to be interpolated is positioned at G33, which is the center of the image. FIG. 3A shows an image, in which the color of a filter disposed on the pixel to be interpolated is G. FIG. 3B shows an image, in which the color of a filter disposed on a pixel to be interpolated is R or B. Note that in the Bayer array, an R or B filter is disposed on a pixel to be interpolated, and therefore, R and B filters are represented by P and Q in FIG. 3B.

It is known that luminance significantly changes at an edge portion of an image, while a change in color at such a portion is relatively small. For example, the image signal of a G pixel, which mainly contributes to luminance, significantly changes at an edge portion, while the image signals of R and B pixels, which mainly contribute to color components but not luminance, change less.

Figure 2:
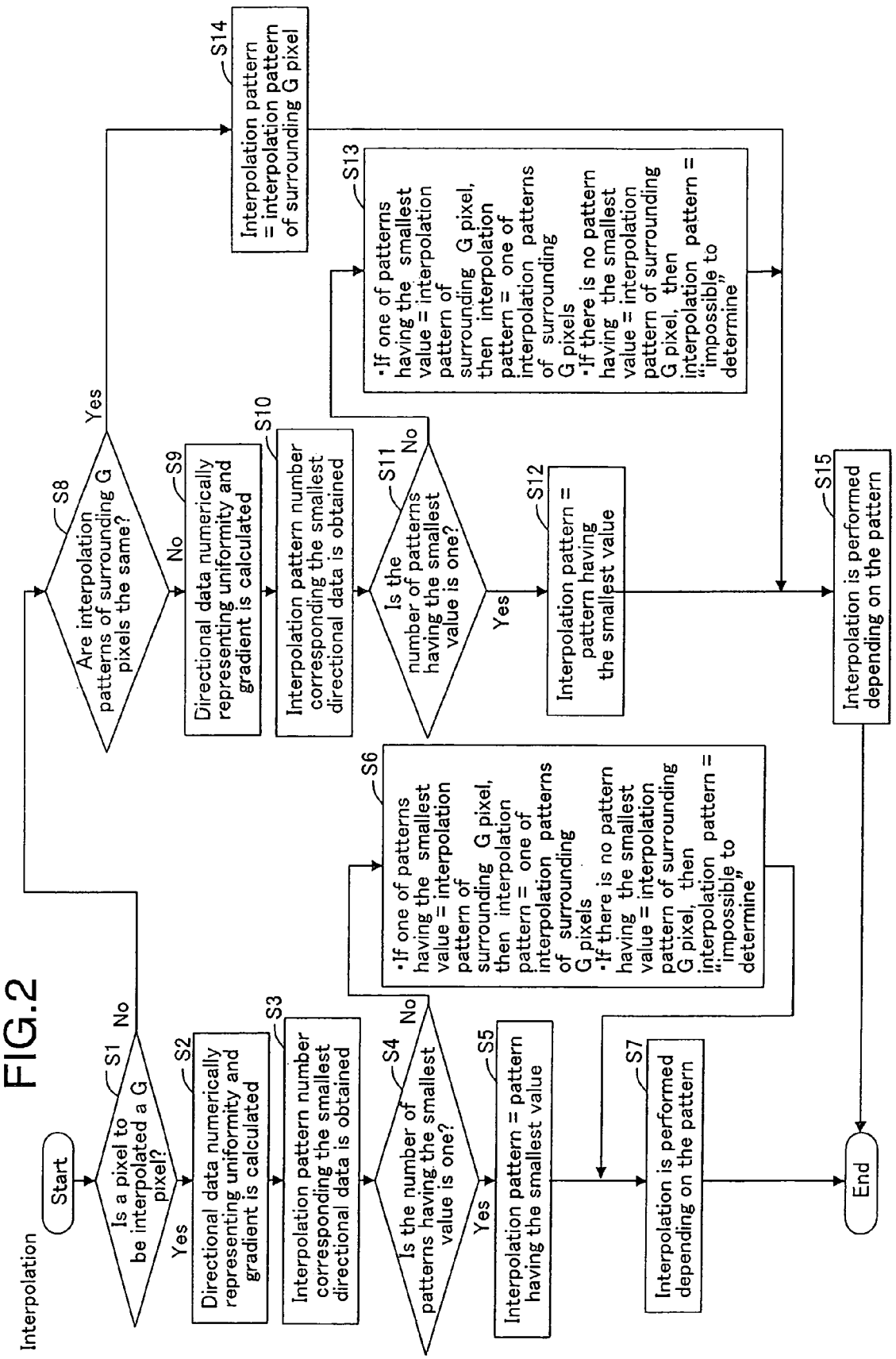
FIG. 2 is a flowchart for explaining a procedure of interpolation performed by the interpolation section of FIG. 1.

Therefore, the interpolation section 8 performs optimal interpolation for each of a G pixel, or an R or B pixel, in step S1 in FIG. 2.

Firstly, interpolation of a G pixel will be described.

In step S2 of FIG. 2, when it is determined in step S1 that interpolation is performed with respect to a G pixel, the uniformity and gradient of image signals of a G pixel to be interpolated and its surrounding pixels are calculated. To obtain the uniformity and gradient of image signals, the uniformity and gradient needs to be put into a numerical form. The numerical data is called directional data.

In this embodiment, interpolation patterns as shown in FIGS. 4A to 4H are stored in the interpolation pattern storage memory 9, for each of which directional data Gv(x) is calculated based on an expression described below. As a result, the same number of pieces of directional data as that of the interpolation patterns are obtained. The directional data represents a similarity to its corresponding interpolation pattern. When the value of the directional data is small, it is determined that a pattern of data values of image signals of a G pixel (a pixel to be interpolated) and its surrounding pixels is similar to the interpolation pattern.

For example, FIG. 4A shows an interpolation pattern, in which low luminance pixels are arranged on a line slanting upward to the right. Thus, the interpolation pattern of FIG. 4A does not have uniformity and has a gradient rising from left to right. When a pattern of data values of image signals is similar to this interpolation pattern, the image data is determined to be present on the line slanting upward to the right. Therefore, the directional data Gv(1), which represents a numerical value of the similarity between a pattern of the data values of image signals of a pixel to be interpolated and its surrounding pixels, and the interpolation pattern, can be obtained by calculating an average of the differences between G33, which is a pixel to be interpolated, and the values of the remaining pixels G51, G42, G24, and G15. Therefore, the directional data Gv(1) is represented by:

$$Gv(1)=(|G33-G51|+|G33-G42|+|G33-G24|+|G33-G15|)/4.$$

When the image signals of the pixel to be interpolated and its surrounding pixels match the interpolation pattern, all of the differences are zero. The smaller the value of the directional data Gv(1), the higher the similarity between the pattern of the data values of the image signals of the pixel to be interpolated and its surrounding pixels, and the interpolation pattern of FIG. 4A.

FIG. 4B shows an interpolation pattern, in which low luminance pixels are horizontally arranged. Thus, the interpolation pattern of FIG. 4B does not have uniformity and its gradient is horizontal. Directional data Gv(2), which represents a numerical value of the similarity between a pattern of the data values of image signals of a pixel to be interpolated and its surrounding pixels, and the interpolation pattern, is calculated by:

$$Gv(2)=(|G33-G13|+|G33-G53|)/2.$$

The smaller the value of the directional data Gv(2), the higher the similarity between the pattern of the data values of the image signals of the pixel to be interpolated and its surrounding pixels, and the interpolation pattern of FIG. 4B.

FIG. 4C shows an interpolation pattern, in which low luminance pixels are arranged on a line slanting downward to the right. Thus, the interpolation pattern of FIG. 4C does not have uniformity and has a gradient falling from left to right. Directional data Gv(3), which represents a numerical value of the similarity between a pattern of the data values of image signals of a pixel to be interpolated and its surrounding pixels, and the interpolation pattern, is calculated by:

$$Gv(3)=(|G33-G11|+|G33-G22|+|G33-G44|+|G33-G55|)/4.$$

The smaller the value of the directional data Gv(3), the higher the similarity between the pattern of the data values of the image signals of the pixel to be interpolated and its surrounding pixels, and the interpolation pattern of FIG. 4C.

FIG. 4D shows an interpolation pattern, in which low luminance pixels are vertically arranged. Thus, the interpolation pattern of FIG. 4D does not have uniformity and its gradient is vertical. Directional data Gv(4), which represents a numerical value of the similarity between a pattern of the data values of image signals of a pixel to be interpolated and its surrounding pixels, and the interpolation pattern, is calculated by:

$$Gv(4)=(|G33-G31|+|G33-G35|)/2.$$

The smaller the value of the directional data Gv(4), the higher the similarity between the pattern of the data values of the image signals of the pixel to be interpolated and its surrounding pixels, and the interpolation pattern of FIG. 4D.

FIG. 4E shows an interpolation pattern, in which low luminance pixels are arranged together on an upper left portion of the pattern. Thus, the interpolation pattern of FIG. 4E has uniformity (upper left portion) and a gradient (corner). Directional data Gv(5), which represents a numerical value of the similarity between a pattern of the data values of image signals of a pixel to be interpolated and its surrounding pixels, and the interpolation pattern, is calculated by:

$$Gv(5)=(|G33-G11|+|G33-G31|+|G33-G22|+|G33-G13|)/4.$$

The smaller the value of the directional data Gv(5), the higher the similarity between the pattern of the data values of the image signals of the pixel to be interpolated and its surrounding pixels, and the interpolation pattern of FIG. 4E.

FIG. 4F shows an interpolation pattern, in which low luminance pixels are arranged together on an upper right portion of the pattern. Thus, the interpolation pattern of FIG. 4F has uniformity (upper right portion) and a gradient (corner). Directional data Gv(6), which represents a numerical value of the similarity between a pattern of the data values of image signals of a pixel to be interpolated and its surrounding pixels, and the interpolation pattern, is calculated by:

$$Gv(6)=(|G33-G31|+|G33-G42|+|G33-G51|+|G33-G53|)/4.$$

The smaller the value of the directional data Gv(6), the higher the similarity between the pattern of the data values of the image signals of the pixel to be interpolated and its surrounding pixels, and the interpolation pattern of FIG. 4F.

FIG. 4G shows an interpolation pattern, in which low luminance pixels are arranged together on a lower left portion of the pattern. Thus, the interpolation pattern of FIG. 4G has uniformity (lower left portion) and a gradient (corner). Directional data Gv(7), which represents a numerical value of the similarity between a pattern of the data values of image signals of a pixel to be interpolated and its surrounding pixels, and the interpolation pattern, is calculated by:

$$GV(7)=(|G33-G13|+|G33-G24|+|G33-G15|+|G33-G35|)/4.$$

The smaller the value of the directional data Gv(7), the higher the similarity between the pattern of the data values of the image signals of the pixel to be interpolated and its surrounding pixels, and the interpolation pattern of FIG. 4G.

FIG. 4H shows an interpolation pattern, in which low luminance pixels are arranged together on a lower right portion of the pattern. Thus, the interpolation pattern of FIG. 4H has uniformity (lower right portion) and a gradient (corner). Directional data Gv(8), which represents a numerical value of the similarity between a pattern of the data values of image signals of a pixel to be interpolated and its surrounding pixels, and the interpolation pattern, is calculated by:

$$Gv(8)=(|G33-G35|+|G33-G44|+|G33-G53|+|G33-G55|)/4.$$

The smaller the value of the directional data Gv(8), the higher the similarity between the pattern of the data values of the image signals of the pixel to be interpolated and its surrounding pixels, and the interpolation pattern of FIG. 4H.

In the above-described expressions for calculating directional data, two or four pieces of data of image signals are used. In either case, the number of pieces of data corresponds to the number of all G pixels present on the interpolation pattern.

The pattern of the data values of the image signals of the pixel to be interpolated and its surrounding pixels, which has the smallest of directional data values Gv(1) to Gv(8), is most similar to the interpolation pattern stored in the interpolation pattern storage memory 9. The numerical value in ( ) of directional data is referred to as an interpolation pattern number. In this case, the interpolation pattern is referred to as Gn33.

In step S3 of FIG. 2, the above-described directional data Gv(1) to Gv(8) are used to obtain the interpolation pattern having the smallest directional data value for the image signals of a pixel to be interpolated and its surrounding pixels.

For example, when a horizontally striped pattern as shown in FIG. 5A (two stripes) is imaged so that the data values of image signals as shown in FIG. 5B are obtained, Gv(1) to Gv(8) are obtained as follows, where pixel G33 is a pixel to be interpolated, Gv(1)=(100+100+100+0)/4=75

Gv(2)=(0+0)/2=0

Gv(3)=(100+100+100+0)/4=75

Gv(4)=(100+0)/2=50

Gv(5)=(100+100+100+0)/4=75

Gv(6)=(100+100+100+0)/4=75

Gv(7)=(100+0+0+0)/4=25

Gv(8)=(100+0+0+0)/4=25.

In this case, the directional data having the smallest value is Gv(2), which is the only smallest of the interpolation pattern directional data.

Next, in step S4 of FIG. 2, it is determined whether or not only one interpolation pattern provides the smallest directional data value. When there is only one interpolation pattern (Yes), the process goes to step S5. When there are two or more interpolation patterns (No), the process goes to step S6.

In step S5, for example, when the smallest value is Gv(2), it can be seen that the pattern of the data values of the image signals of a pixel to be interpolated and its surrounding pixels is similar to the interpolation pattern shown in FIG. 4B. In this case, the interpolation section 8 stores the interpolation pattern (Gn33=2) for the pixel to be interpolated, into the interpolation pattern storage memory 9.

In step S7, the interpolation section 8 performs interpolation corresponding to each interpolation pattern. Color data obtained by interpolation is designated Go, Po or Qo. The color data can be calculated by an interpolation expression previously prepared in the interpolation pattern storage memory 9 or the like, which corresponds to the interpolation pattern of the color data.

Hereinafter, an exemplary interpolation expression suitable for each of the interpolation patterns corresponding to Gv(1) to Gv(8) will be described.

Interpolation pattern number 1: (Gv(1) is the smallest)

Go=(G15+G24×2+G33×2+G42×2+G51)/8

Po=(P14+P34+P32+P52)/4

Qo=(Q23+Q25+Q43+Q41)/4

Interpolation pattern number 2: (Gv(2) is the smallest)

Go=(G13+G33×2+G53)/4

Po=(P12+P14+P32×2+P34×2+P52+P54)/8

Qo=(Q23+Q43)/2

Interpolation pattern number 3: (Gv(3) is the smallest)

Go=(G11+G22×2+G33×2+G44×2+G55)/8

Po=(P12+P34+P32+P54)/4

Qo=(Q21+Q23+Q43+Q45)/4

Interpolation pattern number 4: (Gv(4) is the smallest)

Go=(G31+G33×2+G35)/4

Po=(P32+P34)/2

Qo=(Q21+Q41+Q23×2+Q43×2+Q25+Q45)/8

Interpolation pattern number 5: (Gv(5) is the smallest)

Go=(G11+G13+G22+G31+G33×4)/8

Po=(P12+P32)/2

Qo=(Q21+Q23)/2

Interpolation pattern number 6: (Gv(6) is the smallest)

Go=(G31+G42+G53+G51+G33×4)/8

Po=(P32+P52)/2

Qo=(Q41+Q43)/2

Interpolation pattern number 7: (Gv(7) is the smallest)

$$Go=(G13+G15+G24+G35+G33\times4)/8$$

$$Po=(P14+P34)/2$$

$$Qo=(Q23+Q25)/2$$

Interpolation pattern number 8: (Gv(8) is the smallest)

$$Go=(G35+G44+G53+G55+G33\times4)/8$$

$$Po=(P34+P54)/2$$

$$Qo=(Q43+Q45)/2$$

By using the above-described expression to perform interpolation, color data can be calculated.

In the above-described interpolation expressions, an average of image signals are calculated to obtain Go, Po, and Qo. In this case, the number of pixels to be averaged is a power of 2. This is because if powers of 2 are used, calculation can be facilitated by bit shift operations, so that the calculator (hardware) can be easily constructed and the calculation speed can be increased. Averaging where the number of data values is a power of 2, is performed by weighting a specific pixel(s), rather than a simple average. This is because more accurate data can be obtained by using data from pixels nearer a pixel to be interpolated.

Hereinafter, step S4 of FIG. 2 will be described. There is not always only one interpolation pattern having the smallest directional data value. For example, when a horizontally striped pattern as shown in FIG. 5A is imaged, the data values of the image signals are obtained as shown FIG. 5B. In this case, if G31 becomes "0" due to an influence, such as noise or the like, as shown in FIG. 5C, Gv(1) to Gv(8) are calculated as follows:

$$Gv(1)=(100+100+100+0)/4=75$$

$$Gv(2)=(0+0)/2=0$$

$$Gv(3)=(100+100+100+0)/4=75$$

$$Gv(4)=(0+0)/2=0$$

$$Gv(5)=(100+100+100+0)/4=75$$

$$Gv(6)=(100+100+100+0)/4=75$$

$$Gv(7)=(100+0+0+0)/4=25$$

$$Gv(8)=(100+0+0+0)/4=25.$$

According to the above-described results of calculation, Gv(2) and Gv(4) are the smallest directional data value.

Thus, as shown in the above-described calculation results, two or more interpolation patterns are likely to be obtained in the method for obtaining an interpolation pattern and an interpolation pattern number, which have the smallest directional data value. It is not possible to determine which interpolation pattern is used in the optimum interpolation expression.

In this embodiment, in step S6 of FIG. 2, when there are two or more interpolation patterns having the smallest directional data value, a correlation with the interpolation patterns of the surrounding pixels whose optimum interpolation pattern has already been determined are taken into consideration. This is because, in images, the data value of an image signal of a pixel to be interpolated is highly correlated with the data values of image signals of its surrounding pixels.

In FIG. 5C, interpolation is performed from the upper left pixel to the right and then downward, . . . , i.e., Q01, G11, . . . , Q41, G51, G02, P12, . . . , Q45, G55.

A current pixel to be interpolated is assumed to be G33. When interpolation is performed in the above-described sequence, the pixels G13, G22, and G31 are already subjected to interpolation. The interpolation pattern numbers thereof are stored in the interpolation pattern storage memory 9.

The pixels G13, G22, and G31 of FIG. 5C are assumed to have the stored interpolation pattern numbers Gn13, Gn22, and Gn31, respectively. In this case, a horizontally striped pattern having two stripes of FIG. 5A is imaged, so that clearly Gn13 and Gn22=2 and Gn31≠4. Therefore, it is determined that Gv(2) is correlated with the interpolation patterns of the surrounding pixels. Specifically, if one of the interpolation patterns having the smallest value is the interpolation pattern of the surrounding G pixel, the interpolation pattern is one of the interpolation patterns of the surrounding G pixels. In this case, in step S7, "interpolation corresponding to a pattern" is performed. Specifically, the optimum interpolation pattern number G33 is determined to be 2, and the interpolation expression suitable for the interpolation pattern of Gv(2) is used to perform interpolation.

As a result, even when an influence of noise alters the data of FIG. 5B to the data of FIG. 5C, interpolation of pixel G33 can be performed to calculate accurate color data without an influence from noise.

However, in the case of an image as shown in FIG. 5D, directional data Gv(1) to Gv(8) all have the same value, and there is no correlation with the interpolation patterns of the surrounding pixels. In this case, in step S6, it is determined that it is not possible to determine an interpolation pattern having the smallest value. In other words, if there is no "smallest interpolation pattern=the interpolation pattern of a surrounding G pixel", it is determined that "the interpolation pattern=impossible to determine". When it is determined as "impossible to determine", "interpolation corresponding to a pattern" is performed in step S7. Specifically, an interpolation expression, which is prepared in the interpolation pattern storage memory 9 in advance to correspond to the case of "impossible to determine", is used to perform interpolation.

Hereinafter, an exemplary interpolation expression for the case of "impossible to determine" will be described.

"Impossible to determine":

$$Go=(G22+G24+G42+G44+G33\times4)/8$$

$$Po=(P32+P34)/2$$

$$Qo=(Q23+Q43)/2$$

The thus-obtained interpolation pattern number or a number indicating "impossible to determine" is stored as Gn33 in the interpolation pattern storage memory 9, and can be used for verifying the correlation of interpolation patterns when a surrounding pixel is interpolated.

By steps S1 to S7, optimum interpolation can be realized for a G signal which is an image signal mainly contributing to luminance.

Next, interpolation of an R pixel and a B pixel will be described.

Note that the arrangement of B pixels when an R pixel is a pixel to be interpolated is the same arrangement of R pixels when a B pixel is a pixel to be interpolated. Therefore, hereinafter, a pixel to be interpolated is designated P, while the other pixel except for a G pixel is designated Q.

In order to obtain interpolation patterns suitable for a P pixel and a Q pixel, a correlation of interpolation patterns obtained with respect to the surrounding G pixels is verified in step S8 of FIG. 2.

Typically, resolution changes at an edge portion. Particularly luminance (=black and white) changes significantly, while a change in color signal is not substantially noticeable. Therefore, at edge portions, only G pixel data contributing to luminance is processed. If an R or B pixel is interpolated, a portion which is otherwise black comes to have a color signal. Therefore, when an R pixel and a B pixel (a P pixel and a Q pixel) are interpolated, it is necessary to interpolate a correlation of the interpolation pattern of a G pixel and the interpolation patterns of its surrounding pixels.

In this embodiment, in step S8 of FIG. 2, when the interpolation pattern numbers of G pixels surrounding a P pixel to be interpolated are the same, a number corresponding to the interpolation pattern of the surrounding G pixels is used as an optimum interpolation pattern for the P pixel to be interpolated.

In step S8, when the interpolation pattern numbers of the surrounding G pixels are the same, the interpolation pattern of the surrounding G pixel is selected as an interpolation pattern of the P pixel to be interpolated in step S14. For example, the interpolation pattern number of the P pixel to be interpolated is assumed to be Pn33. When interpolation is performed from the upper left pixel to the right and then downward, Gn32 and Gn23 are used as the interpolation pattern numbers of surrounding G pixels. In step S8, if Gn23=Gn32, the interpolation pattern number Pn33 is set to be equal to Gn23 in step S14 of FIG. 2.

Next, in step S8 of FIG. 2, when the interpolation pattern numbers of G pixels surrounding a P pixel to be interpolated are different (No), numerical directional data is calculated to obtain the uniformity and gradient of the image signals of the P pixel to be interpolated and its surrounding pixels.

In this embodiment, interpolation patterns as shown in FIGS. 6A to 6H are prepared in the interpolation pattern storage memory 9. For each interpolation pattern, directional data Pv(x) is calculated by an expression below.

As a result, directional data values having the same numerical value as that of the interpolation patterns are calculated. These directional data values each represent similarity to their respective interpolation patterns. When the numerical value of directional data is small, it is determined that the pattern of data values of image signals of a G pixel to be interpolated and its surrounding pixels is similar to the interpolation pattern. In interpolation of a P pixel, a correlation with its surrounding G pixels is taken into consideration. Therefore, a pattern similar to the interpolation pattern prepared for a G pixel is prepared as an interpolation pattern, and an interpolation pattern number is similarly established.

For example, similar to FIG. 4A, FIG. 6A shows an interpolation pattern, in which low luminance pixels are arranged on a line slanting upward to the right. Thus, the interpolation pattern of FIG. 6A does not have uniformity and has a gradient rising from left to right. When a pattern of data values of image signals is similar to this interpolation pattern, the image data is determined to be present on the line slanting upward to the right. Therefore, the directional data Pv(1), which represents a numerical value of the similarity between a pattern of the data values of image signals of a pixel to be interpolated and its surrounding pixels, and the interpolation pattern, can be obtained by calculating an average of the differences between P33, which is a pixel to be interpolated, and the values of the remaining pixels P51 and P15. Therefore, the directional data Pv(1) is represented by:

$$Pv(1)=(|P33-P51|+|P33-P15|)/2.$$

When the image signals of the pixel to be interpolated and its surrounding pixels match the interpolation pattern, all of the differences are zero. The smaller the value of the directional data Pv(1), the higher the similarity between the pattern of the data values of the image signals of the pixel to be interpolated and its surrounding pixels, and the interpolation pattern of FIG. 6A.

Similar to FIG. 4B, FIG. 6B shows an interpolation pattern, in which low-luminance pixels are horizontally arranged. Thus, the interpolation pattern of FIG. 6B does not have uniformity-and its gradient is horizontal. Directional data Pv(2), which represents a numerical value of the similarity between a pattern of the data values of image signals of a pixel to be interpolated and its surrounding pixels, and the interpolation pattern, is calculated by:

$$Pv(2)=(|P33-P13|+|P33-P53|)/2.$$

The smaller the value of the directional data Pv(2), the higher the similarity between the pattern of the data values of the image signals of the pixel to be interpolated and its surrounding pixels, and the interpolation pattern of FIG. 6B.

Similar to FIG. 4C, FIG. 6C shows an interpolation pattern, in which low luminance pixels are arranged on a line slanting downward to the right. Thus, the interpolation pattern of FIG. 6C does not have uniformity and has a gradient falling from left to right. Directional data Pv(3), which represents a numerical value of the similarity between a pattern of the data values of image signals of a pixel to be interpolated and its surrounding pixels, and the interpolation pattern, is calculated by:

$$Pv(3)=(|P33-P11|+|P33-P55|)/2.$$

The smaller the value of the directional data Pv(3), the higher the similarity between the pattern of the data values of the image signals of the pixel to be interpolated and its surrounding pixels, and the interpolation pattern of FIG. 6C.

Similar to FIG. 4D, FIG. 6D shows an interpolation pattern, in which low luminance pixels are vertically arranged. Thus, the interpolation pattern of FIG. 6D does not have uniformity and its gradient is vertical. Directional data Pv(4), which represents a numerical value of the similarity between a pattern of the data values of image signals of a pixel to be interpolated and its surrounding pixels, and the interpolation pattern, is calculated by:

$$Pv(4)=(|P33-P31|+|P33-P35|)/2.$$

The smaller the value of the directional data Pv(4), the higher the similarity between the pattern of the data values of the image signals of the pixel to be interpolated and its surrounding pixels, and the interpolation pattern of FIG. 6D.

Similar to FIG. 4E, FIG. 6E shows an interpolation pattern, in which low luminance pixels are arranged together on an upper left portion of the pattern. Thus, the interpolation pattern of FIG. 6E has uniformity (upper left portion) and a gradient (corner). Directional data Pv(5), which represents a numerical value of the similarity between a pattern of the data values of image signals of a pixel to be interpolated and its surrounding pixels, and the interpolation pattern, is calculated by:

$$Pv(5)=(|P33-P11|+|P33-P31|+|P33-P13|)/3.$$

The smaller the value of the directional data Pv(5), the higher the similarity between the pattern of the data values of the image signals of the pixel to be interpolated and its surrounding pixels, and the interpolation pattern of FIG. 6E.

Similar to FIG. 4F, FIG. 6F shows an interpolation pattern, in which low luminance pixels are arranged together on an upper right portion of the pattern. Thus, the interpolation pattern of FIG. 6F has uniformity (upper right portion) and a gradient (corner). Directional data Pv(6), which represents a numerical value of the similarity between a pattern of the data values of image signals of a pixel to be interpolated and its surrounding pixels, and the interpolation pattern, is calculated by:

Pv(6)=(|P33−P31|+|P33−P51|+|P33−P53|)/3.

The smaller the value of the directional data Pv(6), the higher the similarity between the pattern of the data values of the image signals of the pixel to be interpolated and its surrounding pixels, and the interpolation pattern of FIG. 6F.

Similar to FIG. 4G, FIG. 6G shows an interpolation pattern, in which low luminance pixels are arranged together on a lower left portion of the pattern. Thus, the interpolation pattern of FIG. 6G has. uniformity (lower left portion) and a gradient (corner). Directional data Pv(7), which represents a numerical value of the similarity between a pattern of the data values of image signals of a pixel to be interpolated and its surrounding pixels, and the interpolation pattern, is calculated by:

Pv(7)=(|P33−P13|+|P33−P15|+|P33−P35|)/3.

The smaller the value of the directional data Pv(7), the higher the similarity between the pattern of the data values of the image signals of the pixel to be interpolated and its surrounding pixels, and the interpolation pattern of FIG. 6G.

Similar to FIG. 4H, FIG. 6H shows an interpolation pattern, in which low luminance pixels are arranged together on a lower right portion of the pattern. Thus, the interpolation pattern of FIG. 6H has uniformity (lower right portion) and a gradient (corner). Directional data Pv(8), which represents a numerical value of the similarity between a pattern of the data values of image signals of a pixel to be interpolated and its surrounding pixels, and the interpolation pattern, is calculated by:

Pv(8)=(|P33−P35|+|P33−P53|+|P33−P55|)/3.

The smaller the value of the directional data Pv(8), the higher the similarity between the pattern of the data values of the image signals of the pixel to be interpolated and its surrounding pixels, and the interpolation pattern of FIG. 6H.

In the above-described expressions for calculating directional data, two or three pieces of data of image signals are used. In either case, the number of pieces of data corresponds to the number of all P pixels present on the interpolation pattern.

The pattern of the data values of the image signals of the pixel to be interpolated and its surrounding pixels, which has the smallest of directional data Pv(1) to Pv(8), is most similar to the interpolation pattern stored in the interpolation pattern storage memory 9. The numerical value in ( ) of directional data is referred to as an interpolation pattern number. In this case, the interpolation pattern is referred to as Pn33.

In step S10 of FIG. 2, the above-described directional data Pv(1) to Pv(8) are used to obtain the interpolation pattern having the smallest directional data value for the image signals of a pixel to be interpolated and its surrounding pixels.

Next, in step S11 of FIG. 2, it is determined whether or not only one interpolation pattern provides the smallest directional data value. When there is only one interpolation pattern (Yes), the process goes to step S12. When there are two or more interpolation patterns (No), the process goes to step S13.

In step S12 of FIG. 2, since it is determined in step S11 that there is only one interpolation pattern having the smallest directional data value, the interpolation pattern number is stored, as the interpolation pattern number Pn33 of a pixel to be interpolated, in the interpolation pattern storage memory 9.

Instep S12 of FIG. 2, when there are two or more interpolation patterns having the smallest directional data value, correlations with the interpolation patterns of the surrounding pixels, whose optimum interpolation patterns have already been determined, are taken into consideration in step S13. It is now assumed that interpolation is performed from the upper left pixel to the right and then downward. It is also assumed that a current pixel to be interpolated is P33. It is also assumed that pixels G23 and G32 have already been interpolated and their respective interpolation pattern numbers Gn23 and Gn32 (identification information) are stored in the interpolation pattern storage memory 9. When the interpolation pattern number Gn23 and Gn32 match one of two or more interpolation patterns having the smallest directional data value Pv(x), the interpolation pattern number is stored as Pn33 in the interpolation pattern storage memory 9. The reason why G pixels are taken into consideration instead of P and Q pixels is that G pixels are more suitable for pattern detection than P and Q pixels.

When none of the two or more interpolation patterns having the smallest directional data value matches any of the interpolation patterns of the surrounding pixels, it is determined that it is impossible to determine an interpolation pattern in step S13. In this case, interpolation is performed using an interpolation expression corresponding to the "impossible to determine" case, which is stored in the interpolation pattern storage memory 9 in advance.

In step S15 of FIG. 2, interpolation corresponding to each interpolation pattern is performed. Color data obtained by interpolation is designated Go, Po or Qo. The color data can be calculated by an interpolation expression previously prepared in the interpolation pattern storage memory 9 or the like, which corresponds to the interpolation pattern of the color data.

Hereinafter, an exemplary interpolation expression suitable for each of the interpolation patterns corresponding to Pv(1) to Pv(8) will be described.

Interpolation pattern number 1: (Pv(1) is the smallest)

Go=(G14+G25+G23×2+G34×2+G32×2+G43×2+G41+G52)/12

Po=(P15+P33×2+P51)/4

Qo=(Q42+Q24)/2

Interpolation pattern number 2: (Pv(2) is the smallest)

Go=(G23+G43)/2

Po=(P13+P33×2+P53)/4

Qo=(Q22+Q24+Q42+Q44)/4

Interpolation pattern number 3: (Pv(3) is the smallest)

Go=(G12+G21+G23×2+G32×2+G34×2+G43×2+G45+G54)/12

Po=(P11+P33×2+P55)/4

Qo=(Q22+Q44)/2

Interpolation pattern number 4: (Pv(4) is the smallest)

$Go=(G32+G34)/2$ $Po=(P31+P33\times 2+P35)/4$ $Qo=(Q22+Q24+Q42+Q44)/4$

Interpolation pattern number 5: (Pv(5) is the smallest)

$Go=(G12+G21+G23\times 2+G32\times 2)/6$ $Po=(P11+P13+P31+P33\times 3)/6$ $Qo=Q22$ Interpolation pattern number 6: (Pv(6) is the smallest)

$Go=(G41+G52+G32\times 2+G43\times 2)/6$ $Po=(P31+P51+P53+P33\times 3)/6$ $Qo=Q42$ Interpolation pattern number 7: (Pv(7) is the smallest)

$Go=(G14+G25+G23\times 2+G34\times 2)/6$ $Po=(P15+P35+P13+P33\times 3)/6$ $Qo=Q24$ Interpolation pattern number 8: (Pv(8) is the smallest)

$Go=(G54+G45+G34\times 2+G43\times 2)/6$ $Po=(P55+P35+P53+P33\times 3)/6$ $Qo=Q44$ When "Impossible to determine":

$Go=(G23+G32+G34+G43)/4$ $Po=P33$ $Qo=(Q22+Q24+Q42+Q44)/4$

By using the above-described expressions to perform interpolation, color data can be calculated.

As described above, optimum interpolation can be realized for G signals, which are image signals mainly contributing to luminance, and R and B signals, which are image signals not contributing to luminance.

The thus-obtained interpolation pattern number or a number indicating "impossible to determine" are stored in the interpolation pattern storage memory 9. After interpolation, when a digital image signal is processed by the image signal processing section 10, signal processing can be performed by processing signals depending on respective interpolation patterns.

Hereinafter, an exemplary image signal processing will be briefly described, where the interpolation pattern numbers stored in the interpolation pattern storage memory 9 are used to perform edge emphasis processing with respect to an image pattern as shown in FIG. 7A.

FIG. 7B is a diagram showing values of image signals of the image shown in FIG. 7A, where white portions each have a value 100 while black portions each have a value 40. In typical edge emphasis processing, the image signals are subjected to a so-called Laplacian filter as shown in FIG. 7C, and thereafter, the resultant values are added to the original signals.

FIG. 7D is a diagram showing the result of edge emphasis processing. Specifically, the image (data) of FIG. 7B is subjected to the filter of FIG. 7C. Each resultant value is multiplied by ⅛, and is added to the original image.

FIG. 7E is a graph showing the numerical values of pixels G13, Q13, G33, Q43, and G53, which are horizontally arranged in FIG. 7D. FIG. 7F is a graph showing the numerical values of pixels G11, G22, G33, G44, and G55, which are arranged slanting from the upper left in FIG. 7D.

According to FIG. 7E, the edge of the signal is emphasized by the above-described method. According to FIG. 7F, however, the signal of pixel G33 is emphasized to be further minus, while the signal of pixel G22 is not emphasized.

In this embodiment, the interpolation pattern number of each pixel is stored in the interpolation pattern storage memory 9. For example, in the case of the image of FIG. 7A, the interpolation pattern number as shown in FIG. 4A is stored in the interpolation pattern storage memory 9.

As a filter corresponding to the interpolation pattern of FIG. 4A, a filter shown in FIG. 7G is used. The data of pixel G22 is subjected to the filter of FIG. 7G. Each resultant value is multiplied by ¼, and is added to the original image. Thus, edge emphasis processing is performed. The resultant numerical values are shown in FIG. 7H. As can be clearly seen from FIG. 7H, edge emphasis processing is performed by using the interpolation patterns. Similarly, the filters corresponding to the interpolation patterns can be used for other digital signal processing corresponding to the interpolation patterns, such as false color processing and the like.

According to this embodiment, a plurality of interpolation patterns are prepared in the interpolation pattern storage memory 9. The interpolation section 8 obtains an interpolation pattern, which is similar to a pattern of data values of image signals of a pixel to be interpolated and its surrounding pixels, depending on the uniformity and gradient of the image signals of the pixel to be interpolated and its surrounding pixels. Assuming that the pixel to be interpolated is located in the obtained interpolation pattern, an expression corresponding to the interpolation pattern is used to perform interpolation. As a result, interpolation can be performed, taking into consideration the uniformity and gradient of image signals. Therefore, it is possible to prevent image distortion, which occurs in conventional interpolation techniques, irrespective of an influence of noise.

In this embodiment, eight interpolation patterns (9 patterns if including the case of "impossible to determine") are used. However, it is possible to change the number of patterns so as to, for example, reduce the circuit size of the interpolation pattern storage memory 9 or the like. For example, the present inventors conducted an experiment. As a result, among the above-described eight interpolation patterns, the horizontal pattern of FIGS. 4B and 6B, the vertical pattern of FIGS. 4D and 6D, the slanting-downward-to-the-right pattern of FIGS. 4C and 6C, and the slanting-upward-to-the-right pattern of FIGS. 4A and 6A, occupied most cases (about 90%). In view of cost performance, only these four interpolation patterns might be used to represent the uniformity and gradient of image signals. For example, in systems using one-dimensional image, such as a bar code reader and the like, only the interpolation patterns of FIGS. 4D and 6D need to be used. Alternatively, in systems having a sufficient circuit size or operational performance, the line memory 7 may be increased to increase the number of interpolation patterns. In this case, patterns are more precise and therefore improved interpolation can be performed.

In this embodiment, interpolation is performed, depending on the interpolation pattern. Therefore, simple expressions are used. In the present invention, an interpolation pattern, which is similar to a pattern of a pixel to be interpolated and its surrounding pixels, is obtained depending on the uniformity and gradient of the image signals. Interpolation corresponding to the interpolation pattern is performed. For each interpolation pattern, an optimum method for calculating interpolation can be appropriately provided.

In the present invention, an optimum interpolation pattern is obtained based on the uniformity and gradient of a pixel to be interpolated and its surrounding pixels. The interpolation pattern and interpolation patterns of the surrounding pixels are used to determine an interpolation method. Therefore, the interpolation patterns, the number of interpolation patterns, interpolation pattern numbers, an interpolation calculation method, a method for utilizing an interpolation pattern for a pixel to be interpolated, a method for utilizing the interpolation patterns of surrounding pixels, and digital image signal processing after interpolation using an interpolation pattern may be modified as appropriate without departing from the scope of the present invention.

As described above, a data processing apparatus according to the present invention processes an image signal obtained from a solid-state image pickup device, in which a plurality of types of color filters (RGB, etc.) are discretely arranged. When interpolation is performed by this apparatus, an interpolation pattern, which is similar to a pattern of a pixel to be interpolated and its surrounding pixels, is obtained depending on the uniformity and gradient of the image signals of the pixel to be interpolated and its surrounding pixels. Interpolation corresponding to the interpolation pattern is performed. Thus, since interpolation is performed considering the uniformity and gradient of image signals, it is possible to prevent image distortion, which occurs in conventional interpolation techniques. In addition, even when a signal other than an image, such as noise or the like, exists, a satisfactory edge is represented while preventing fluctuation of image signals, which occurs in Japanese Laid-Open Publication No. 7-59098, thereby making it possible to prevent deterioration of resolution.

Moreover, after interpolation, digital image signal processing, such as edge emphasis processing, false color suppression processing, or the like, can be performed based on an interpolation pattern, which has been obtained depending on the uniformity and gradient of image signals of a pixel to be interpolated and its surrounding pixels. Therefore, a satisfactory image signal can be generated.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A data processing apparatus for processing an image signal obtained from a solid-state image pickup device, in which a plurality of types of color filters are discretely provided on pixels, and a pixel to be interpolated and surrounding pixels thereof have image signals, the apparatus comprising:

an interpolation section for generating a missing color signal in the image signal of each pixel by interpolation using at least the image signals of the surrounding pixels among the image signals of the pixel to be interpolated and the surrounding pixels thereof, wherein the interpolation section is arranged so as to select at least one interpolation pattern and to perform interpolation based on the selected at least one interpolation pattern, the selected at least one interpolation pattern being similar to a pattern of data values of the pixel to be interpolated and the surrounding pixels thereof corresponding to the image signal, the selection being based on uniformity and gradient of the image signals of the pixel to be interpolated and the surrounding pixels thereof, and wherein the interpolation section calculates directional data indicating a similarity between each of the at least one interpolation pattern, and the pattern of data values of the pixel to be interpolated and the surrounding pixels thereof, and selects an interpolation pattern where the directional data is the smallest if,
 (a) the pixel to be interpolated is a pixel mainly contributing to luminance, or
 (b) the pixel to be interpolated is a pixel not mainly contributing to luminance and the interpolation patterns of surrounding pixels mainly contributing to luminance are not the same.

2. A data processing apparatus according to claim 1, further comprising:

an interpolation pattern storage section for storing a plurality of interpolation patterns representing the uniformity and gradient of the image signals, wherein the interpolation section selects the interpolation pattern, which is similar to a pattern of data values of the pixel to be interpolated and the surrounding pixels thereof, depending on uniformity and gradient of the image signals of the pixel to be interpolated and the surrounding pixels thereof, from the plurality of interpolation patterns in the interpolation pattern storage section, and performs interpolation depending on the selected interpolation pattern.

3. A data processing apparatus according to claim 2, wherein identification information is given to each of the plurality of interpolation patterns stored in the interpolation pattern storage section, and the interpolation section stores the identification information of the selected interpolation pattern in the interpolation pattern storage section.

4. A data processing apparatus according to claim 2, wherein at least one of the plurality of interpolation patterns stored in the interpolation pattern storage section is used when the pixel to be interpolated is a pixel mainly contributing to luminance, and at least one of the plurality of interpolation patterns stored in the interpolation pattern storage section is used when the pixel to be interpolated is a pixel not mainly contributing to luminance.

5. A data processing apparatus according to claim 2, wherein the interpolation pattern storage section stores, as the plurality of interpolation patterns, a pattern, in which pixels having prescribed values are horizontally arranged; a pattern, in which pixels having prescribed values are vertically arranged; a pattern, in which pixels having prescribed values are arranged slanting upward to the right; a pattern, in which pixels having prescribed values are arranged slanting downward to the right; a pattern, in which pixels having prescribed values are arranged together at an upper left corner portion; a pattern, in which pixels having prescribed values are arranged together at an upper right corner portion; a pattern, in which pixels having prescribed values are arranged together at a lower left corner portion; and a pattern, in which pixels having prescribed values are arranged together at a lower right corner portion.

6. A data processing apparatus according to claim 2, wherein the interpolation section performs interpolation based on a prescribed expression when none of the plurality of interpolation patterns stored in the interpolation pattern storage section is similar to the pattern of the data values of the image signals of the pixel to be interpolated and the surrounding pixels thereof.

7. A data processing apparatus according to claim 2, wherein when two or more of the plurality of interpolation patterns stored in the interpolation pattern storage section are similar to the pattern of the data values of the image signals of the pixel to be interpolated and the surrounding pixels thereof, the interpolation section selects one of the two or more interpolation patterns, depending on an interpolation pattern selected for one or more of the surrounding pixels.

8. A data processing apparatus according to claim 1, wherein the interpolation section selects one of the at least one interpolation pattern based on whether the pixel to be interpolated is a pixel mainly contributing to luminance or a pixel not mainly contributing to luminance, and performs interpolation depending on the selected interpolation pattern.

9. A data processing apparatus according to claim 1, wherein the interpolation section performs interpolation based on an expression corresponding to the obtained interpolation pattern.

10. An image processing apparatus, comprising:
a data processing apparatus according to claim 1; and
an image processing section for perform image processing depending on the interpolation pattern obtained by the data processing apparatus.

11. A camera, comprising an image processing apparatus according to claim 10, wherein the camera receives an image signal from a solid-state image pickup device, and performs the interpolation and the image processing to obtain image data for the camera.

12. An image processing apparatus, according to claim 10, wherein the interpolation section of the data processing apparatus is arranged so as to select the at least one interpolation pattern from a plurality of interpolation patterns, each of the plurality of interpolation patterns being representative of a given uniformity and gradient of the image signals.

13. A data processing apparatus according to claim 1, wherein the interpolation section is arranged so as to select the at least one interpolation pattern from a plurality of interpolation patterns, each of the plurality of interpolation patterns being representative of a given uniformity and gradient of the image signals.

14. A data processing method for processing an image signal obtained from a solid-state image pickup device, in which a plurality of types of color filters are discretely provided on pixels, and a pixel to be interpolated and surrounding pixels thereof have image signals, the method comprising the steps of:
selecting an interpolation pattern, which is similar to a pattern of data values of the pixel to be interpolated and the surrounding pixels thereof, based on uniformity and gradient of the image signals of the pixel to be interpolated and the surrounding pixels thereof;
performing interpolation using the selected interpolation pattern to generate a missing color signal in the image signal of the pixel to be interpolated; and
calculating directional data indicating a similarity between each of the at least one interpolation pattern and the pattern of data values of the pixel to be interpolated and the surrounding pixels thereof and selecting a given interpolation pattern where the directional data is the smallest if,
  (a) the pixel to he interpolated is a pixel mainly contributing to luminance, or
  (b) the pixel to be interpolated is a pixel not mainly contributing to luminance and the interpolation patterns of surrounding pixels mainly contributing to luminance are not the same.

15. A data processing method according to claim 14, wherein said selecting includes selecting the one interpolation pattern from a plurality of interpolation patterns, each of the plurality of interpolations patterns being representative of a given uniformity and gradient of the image signals.

* * * * *